(12) United States Patent  
Rhee et al.

(10) Patent No.: US 8,046,668 B2  
(45) Date of Patent: Oct. 25, 2011

(54) METHOD AND APPARATUS FOR CODE BLOCK SEGMENTATION IN A MOBILE COMMUNICATION SYSTEM

(75) Inventors: Jong-Hun Rhee, Suwon-si (KR); Min-Goo Kim, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 938 days.

(21) Appl. No.: 12/023,477

(22) Filed: Jan. 31, 2008

(65) Prior Publication Data

US 2008/0288850 A1  Nov. 20, 2008

(30) Foreign Application Priority Data

Jan. 31, 2007 (KR) .................. 10-2007-0010283  
Feb. 14, 2007 (KR) .................. 10-2007-0015177

(51) Int. Cl.  
*H03M 13/00*  (2006.01)

(52) U.S. Cl. ..................................... 714/776

(58) Field of Classification Search .............. 714/746, 714/776, 810; 375/240.27, 242  
See application file for complete search history.

(56) References Cited

U.S. PATENT DOCUMENTS

| 7,012,911 B2 | 3/2006 | Kasturi et al. |
| 7,231,584 B2 | 6/2007 | Gunther et al. |
| 2008/0028281 A1* | 1/2008 | Miyazaki et al. ............ 714/776 |

FOREIGN PATENT DOCUMENTS

KR  1020040042935  5/2004

OTHER PUBLICATIONS

3GPP TS 25.222 V4.4.0, 3rd Generation Partnership Project; Technical Specification Group Radio Acces Network; Multiplexing and Channel Coding (TDD), Release 4, Jun. 2002.  
3GPP TS 25.212 V5.0.0, 3rd Generation Partnership Project; Technical Specification Group Radio Access Network; Multiplexing and Channel Coding (FDD), Release 5, Mar. 2002.  
Divsalar et al.: Turbo Codes for PCS Applications, 1995 IEEE International Conference on Gateway to Globalization, vol. 1, Jun. 1995.

* cited by examiner

*Primary Examiner* — Shelly A Chase  
(74) *Attorney, Agent, or Firm* — The Farrell Law Firm, P.C.

(57) ABSTRACT

A method for segmenting an information word into code blocks in a mobile communication system. The method includes setting a number C of code blocks to a minimum integer not less than a value obtained by dividing X by Z; when sizes K of all code blocks are determined to be equal when a length X of the information word is greater than a maximum length Z of each code block, determining a minimum integer value T not less than a value obtained by dividing a size of the information word by a number of code blocks, and determining, as K, a maximum value most approaching the value T among the values based on which a size of the code block can be set in units of eight bits; and generating a code block by inserting filler bits into a specific code block when a value obtained by multiplying K by C is greater than X.

21 Claims, 8 Drawing Sheets

FIG.8

METHOD AND APPARATUS FOR CODE BLOCK SEGMENTATION IN A MOBILE COMMUNICATION SYSTEM

PRIORITY

This application claims priority under 35 U.S.C. §119(a) to a Korean Patent Application filed in the Korean Intellectual Property Office on Jan. 31, 2007 and assigned Serial No. 2007-10283, and a Korean Patent Application filed in the Korean Intellectual Property Office on Feb. 14, 2007 and assigned Serial No. 2007-15177, the disclosures of each of which are hereby incorporated by reference.

BACKGROUND OF THE INVENTION

1. Field of the Invention

The present invention generally relates to an apparatus and method for segmenting transmission data and combining received data in a mobile communication system, and in particular, to a method and apparatus for performing segmentation and combination according to a size of a transmission packet during code block segmentation and combination.

2. Description of the Related Art

Mobile communication systems generally channel-encode source user data with an error correction code before transmission, to improve reliability of transmission data. Typical codes used for channel encoding can be classified into a convolution code and a linear block code for which a single decoder is used. Recently, aside from such typical codes, a turbo code has been proposed and widely used. A turbo code has been widely used because, for example, a turbo code has an advantage because error correction performance increases with a size of an information word.

However, the error correction performance of the turbo code becomes saturated when the size of the information word is greater than or equal to a particular size. An increase in the size of the information word increases a size of an interleaver in a turbo coder, causing an increase in complexity of a decoder.

In this context, the turbo code has no performance and implementation gain when the size, i.e., coding length, of the information word is longer than or equal to a specific length. Therefore, a scheme has been proposed, which segments the information word into multiple code blocks and separately encodes each of the code blocks. The 3$^{rd}$ Generation Partnership Project (3GPP) standard defines this scheme as code block segmentation.

For example, when the size of the information word is greater than or equal to 5114 bits, the scheme segments the information word so the size of the information word is not greater than 5114 bits. Each of the parts segmented from the information word is called a code block, and the turbo coder performs coding on each of the code blocks independently.

Figure 1:
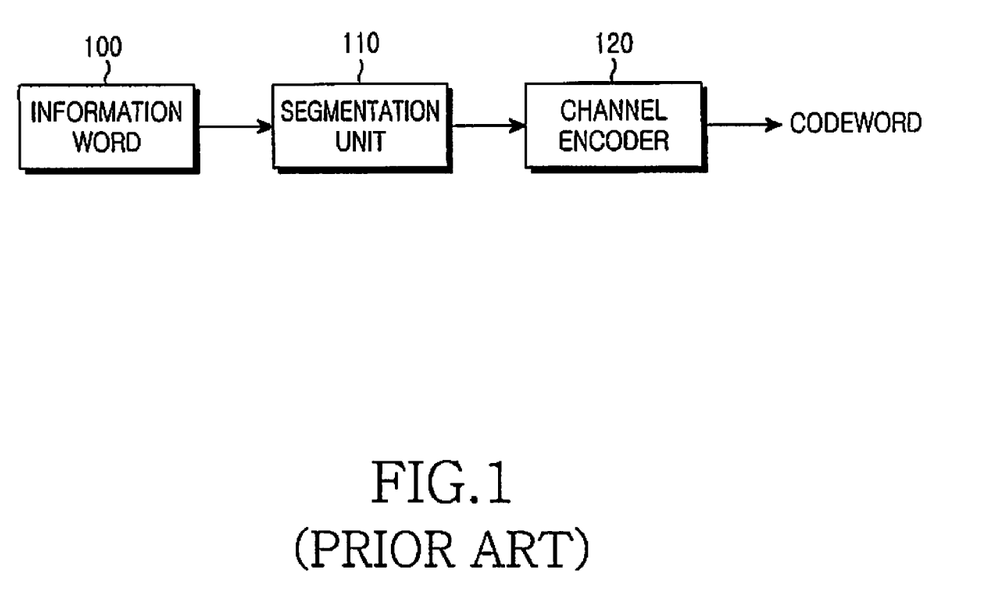
FIG. 1 is a block diagram of a transmitter for performing code block segmentation according to the prior art.

FIG. 1 shows a transmitter for performing code block segmentation according to the prior art.

In FIG. 1, an information word 100, meaning transmission data, is input to a segmentation unit 110. The segmentation unit 110 serves to segment a generated information word in units of code blocks according to a particular length, and this is called a code block segmentation operation. A channel encoder 120 performs turbo or convolutional coding on the input codes segmented in units of code blocks, and outputs a coded codeword. The codeword is divided into information (systematic) bits and parity bits. The information (systematic) bit means the desired transmission signal itself, and the parity bit is a signal added to correct the error occurred during transmission, during its decoding.

Figure 2:
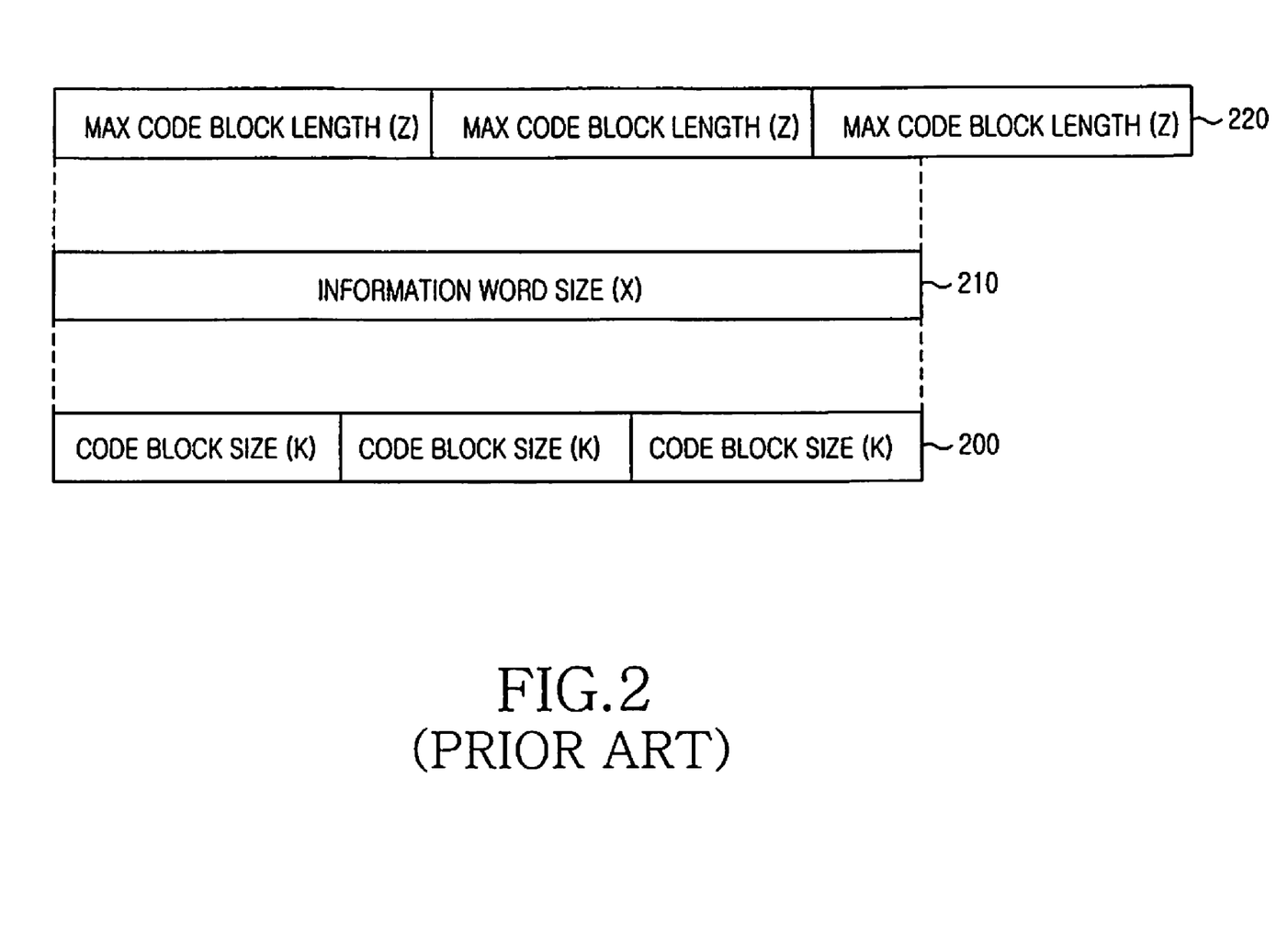
FIG. 2 illustrates an example in which one information code is segmented into three code blocks according to the prior art.

FIG. 2 illustrates an example in which one information code is segmented into three code blocks according to the prior art.

Referring to FIG. 2, for a turbo coder, a maximum size Z (220) of a code block is 5114 bits. An input information word size X (210) is assumed herein to be bits. The conventional segmentation unit 110 shown in FIG. 1 segments an information word according to the code block segmentation operation. The size of the information word should be less than the maximum size Z (220) of the code block. Therefore, because the information word is 12999 bits in size, the information word should be segmented into three code blocks. A size K (200) of each of the three segmented code blocks is 4333 bits. As a result, the channel encoder 120, like the turbo coder, separately encodes the three 4333-bit code blocks, thereby generating three codewords.

The code block segmentation shown in FIG. 2 may have the following problems.

For example, a unit of the information word is assumed to be a byte and the maximum code block length is assumed to be 5120 bits. The minimum size of the information word defined in the 3GPP standard is also assumed to be 40 bits. Therefore, since the minimum size of the code block is 40 bits, the maximum length of the code block is 5120 bits, and the unit of the information word is byte, the sizes increase in order of 40, 48, 56, 64, 72, ..., 5120 from the minimum size of the code block through the maximum size of the code block. In this case, the total number of types of the possible codewords generated by the channel encoder 120 is (5120−40)/8+1=636.

However, for an information word being greater than or equal to 5120 bits in size, when it is segmented by the code block segmentation process shown in FIG. 2, a 5128-bit information word, since 5128 bits are 2564×2 bits, is segmented into two 2564-bit code blocks, and a 5136-bit information word, since 5136 bits are 2568×2 bits, is segmented into two 2568-bit code blocks. If the information words with the 5128-bit size and the 5136-bit size undergo the code block segmentation process shown in FIG. 2, an interval between the code blocks is reduced to four (=2568-2564) bits. In addition, for an information word being greater than or equal to 15360 bits in size, since the information word should be segmented into three code blocks, an interval between the code blocks is reduced to two bits.

As described above, in the conventional code block segmentation, the interval between the segmented code blocks decreases with the size of the information word. For example, although an interval between a 20496-bit information word and a 20504-bit information word is eight bits, after their code block segmentation, the segmented code blocks have 4100-bit and 4101-bit sizes, respectively, so an interval therebetween is one bit. In this way, the code block segmentation operation may increase the number of types of the generated codewords. The increase in the number of types of the generated codewords may increase the channel coding complexity in the process of optimizing channel codes.

For a channel encoder having an interleaver therein, like the turbo coder, the increase in the number of code blocks causes an increase in the number of types of interleavers, thereby increasing the complexity. Therefore, a great need exists for a scheme of reducing the system complexity by minimizing the number of types of the code blocks.

SUMMARY OF THE INVENTION

The present invention substantially addresses at least the above-described problems and/or disadvantages and provides at least the advantages described below. Accordingly, an aspect of the present invention is to provide an apparatus and method for code block segmentation and combination, for preventing an increase in the number of types of codewords in a mobile communication system.

Another aspect of the present invention is to provide an apparatus and method for code block segmentation and combination, for preventing an increase in system complexity.

According to an aspect of the present invention, there is provided a method for segmenting an information word into code blocks in a mobile communication system. The method includes setting a number C of code blocks to a minimum integer not less than a value obtained by dividing X by Z when a length X of the information word is greater than a maximum length Z of each code block; determining a minimum integer value T not less than a value obtained by dividing a size of the information word by a number of code blocks when sizes K of all code blocks are determined to be equal, and determining, as K, a maximum value most approaching the value T among the values based on which a size of the code block can be set in units of eight bits; and generating a code block by inserting filler bits into a specific code block when a value obtained by multiplying K by C is greater than X.

According to another aspect of the present invention, there is provided a method for segmenting an information word into code blocks in a mobile communication system. The method includes setting a number C of code blocks to a minimum integer not less than a value obtained by dividing X by Z when a length X of the information word is greater than a maximum length Z of each code block; setting a minimum size U of each code block so a minimum size U has a size obtained by calculating in units of bits a value having a maximum integer not greater than a value obtained by dividing a value obtained by converting the X in units of bytes by the C when sizes K of the code blocks are determined to be different from each other; setting a size of R code blocks among the C code blocks, wherein the R corresponds to a value obtained by dividing by eight a difference between X and a product of C and U, and each of the R code blocks has a size greater by one byte than U; and setting remaining code blocks obtained by excluding the R code blocks from the C code blocks so the remaining code blocks have a size of U.

According to a further aspect of the present invention, there is provided a method for channel-encoding and transmitting an information word in a mobile communication system. The method includes a segmentation process of setting a number C of code blocks to a minimum integer not less than a value obtained by dividing X by Z; when sizes K of all code blocks are determined to be equal when a length X of the information word is greater than a maximum length Z of each code block, determining a minimum integer value T not less than a value obtained by dividing a size of the information word by a number of code blocks, and determining, as K, a maximum value most approaching the value T among the values based on which a size of the code block can be set in units of eight bits; and generating segmented code blocks by inserting filler bits into a specific code block when a value obtained by multiplying K by C is greater than X; channel-encoding the segmented code blocks independently; and channel-modulating the channel-encoded code blocks before transmission.

According to still another aspect of the present invention, there is provided a method for channel-encoding and transmitting an information word in a mobile communication system. The method includes a segmentation process of; setting a number C of code blocks to a minimum integer not less than a value obtained by dividing X by Z when a length X of the information word is greater than a maximum length Z of each code block; setting a minimum size U of each code block so the minimum size U has a size obtained by calculating in units of bits a value having a maximum integer not greater than a value obtained by dividing a value obtained by converting X in units of bytes by C when sizes K of the code blocks are determined to be different from each other; setting a size of R code blocks among the C code blocks, wherein R corresponds to a value obtained by dividing by eight a difference between X and a product of C and U, and each of the R code blocks has a size greater by one byte than U; and setting remaining code blocks obtained by excluding the R code blocks from the C code blocks so the remaining code blocks have a size of U; channel-encoding the segmented code blocks independently; and channel-modulating the channel-encoded code blocks before transmission.

According to yet another aspect of the present invention, there is provided an apparatus for segmenting an information word into code blocks before transmission in a mobile communication system. The apparatus includes a segmentation unit for; setting a number C of code blocks to a minimum integer not less than a value obtained by dividing X by Z when a length X of the information word is greater than a maximum length Z of each code block; determining a minimum integer value T not less than a value obtained by dividing a size of the information word by a number of code blocks when sizes K of all code blocks are determined to be equal, and determining, as K, a maximum value most approaching the value T among the values based on which a size of the code block can be set in units of eight bits; and generating segmented code blocks by inserting filler bits into a specific code block when a value obtained by multiplying K by C is greater than X; a channel encoder for channel-encoding the segmented code blocks independently; a channel modulator for channel-modulating the channel-encoded code blocks; and a transmitter for converting an output of the channel modulator into a transmission-band signal.

According to still another aspect of the present invention, there is provided an apparatus for segmenting an information word into code blocks before transmission in a mobile communication system. The apparatus includes a segmentation unit for; setting a number C of code blocks to a minimum integer not less than a value obtained by dividing X by Z when a length X of the information word is greater than a maximum length Z of each code block; setting a minimum size U of each code block so the minimum size U has a size obtained by calculating in units of bits a value having a maximum integer not greater than a value obtained by dividing a value obtained by converting X in units of bytes by C when sizes K of the code blocks are determined to be different from each other; setting a size of R code blocks among the C code blocks, wherein R corresponds to a value obtained by dividing by eight a difference between X and a product of C and U, and each of the R code blocks has a size greater by one byte than the U; and setting remaining code blocks obtained by excluding the R code blocks from the C code blocks so the remaining code blocks have a size of U; a channel encoder for channel-encoding the segmented code blocks independently; a channel modulator for channel-modulating the channel-encoded code blocks; and a transmitter for converting an output of the channel modulator into a transmission-band signal.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will now be described in detail with reference to the annexed drawings. In the following description, a detailed description of known functions and configurations incorporated herein has been omitted for clarity and conciseness.

A description of the present invention will be made herein with reference to a Long Term Evolution (LTE) system, which is a next generation mobile communication system based on a $3^{rd}$ Generation Partnership Project (3GPP) mobile communication system. However, the present invention may also be applied to other communication systems.

The present invention provides a scheme of channel-encoding an information word generated in specific units in the LTE system, in a manner of guaranteeing a size of a code block generated after code block segmentation, to a specific unit. The present invention provides a scheme capable of reducing complexity of (or simply implementing) a transmitter/receiver, i.e., a mobile communication system, in a process of performing channel coding. In a mobile communication system, a channel encoder, like a turbo coder, has a characteristic that system performance is saturated for a codeword whose size is greater than or equal to a specific size. Therefore, to reduce implementation complexity of the channel encoder, a scheme has been suggested, which limits the size of the codeword to a particular size or smaller. This scheme is called code block segmentation technology.

In this context, the present invention provides a scheme for preventing an increase in the number of types of codeword lengths according to the code block segmentation operation, and reducing system implementation complexity according thereto. In addition, the present invention minimizes the number of types of turbo code lengths, thereby simplifying a structure of the receiver, or terminal. That is, the present invention provides a code block segmentation scheme for preventing an increase in the number of code length sets, caused by code block segmentation.

Figure 3:
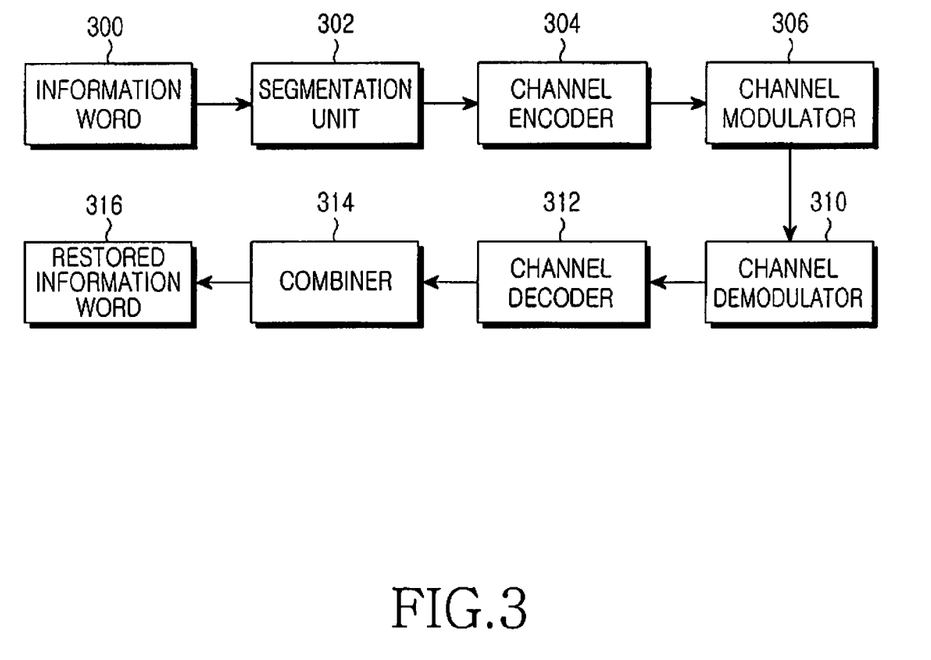
FIG. 3 is a block diagram of a transmitter/receiver for segmenting a generated information word in units of blocks whose size is less than or equal to a particular size, according to an embodiment of the present invention.

FIG. 3 shows a transmitter/receiver for segmenting a generated information word in units of blocks whose size is less than or equal to a particular size, according to the present invention.

Referring to FIG. 3, an information word 300, or desired transmission information, is input to a segmentation unit 302. The segmentation unit 302 serves to segment the information word in units of code blocks according to a particular code length. For a turbo coder according to the present invention, the maximum code block size is limited to a particular number, such as 5114 bits. Accordingly, when there is an intention to transmit data whose size is greater than the maximum code block size processable by a channel encoder 304, the data undergoes code block segmentation using the scheme according to the present invention. That is, when the size of the input data is greater than the maximum code block size acceptable by the channel encoder 304, the channel encoder 304 increases the number of code blocks to segment the input data in the same quantity according to the increased number of code blocks and perform several times of turbo coding thereon.

The channel encoder 304 performs turbo or convolutional coding on input codes segmented in units of the code blocks, and outputs a coded codeword. A channel modulator 306 transfers the generated codeword to a receiver in the form of a wireless channel by means of a channel modulation process such as Quadrature Phase Shift Keying (QPSK), 8-ary Phase Shift Keying (8PSK), 16-ary Quadrature Amplitude Modulation (16QAM), 64QAM, etc.

In the receiver, a channel demodulator 310 performs demodulation on a received channel. A channel decoder 312 performs channel decoding on the demodulated signal to generate a decoded signal. A combiner 314 restores the original-length information word 316 by way of an inverse code block segmentation process.

The present invention provides a code block segmentation execution method in which even for the code blocks generated after an information word generated in a particular unit size undergoes code block segmentation, the generated code blocks have the same unit size.

The code block segmentation process according to the present invention is defined as follows.

In the code block segmentation process provided by the present invention, although an $8 \times 2^n$-bit unit (where n=0, 1, 2, ...), or a unit of an information word, (i.e., 8-bit unit, 16-bit unit, 32-bit unit, 64-bit unit, 128-bit unit, 256-bit unit, ...), is available, the following description will be made herein with reference to the 8-bit unit as an information word unit, for convenience. Alternatively, an 8×N-bit unit can also be used as the unit of the information word. The information word is always configured in one of the above-stated bit units, and if the unit of the information word corresponds to none of the above-stated bit units, the information word can be configured in the 8-bit unit through a bit padding process.

Parameters commonly used for two embodiments of the present invention described below are defined as follows.

Z: the maximum size of a code block
C: the number of code blocks
X: information word length
K(i): size of an $i^{th}$ code block. If its value is equal for all 'i's, it will be expressed as K, with 'i' omitted.
Y: size of filler bits FIG. 4 illustrates code block segmentation according to the present invention.

Figure 4:
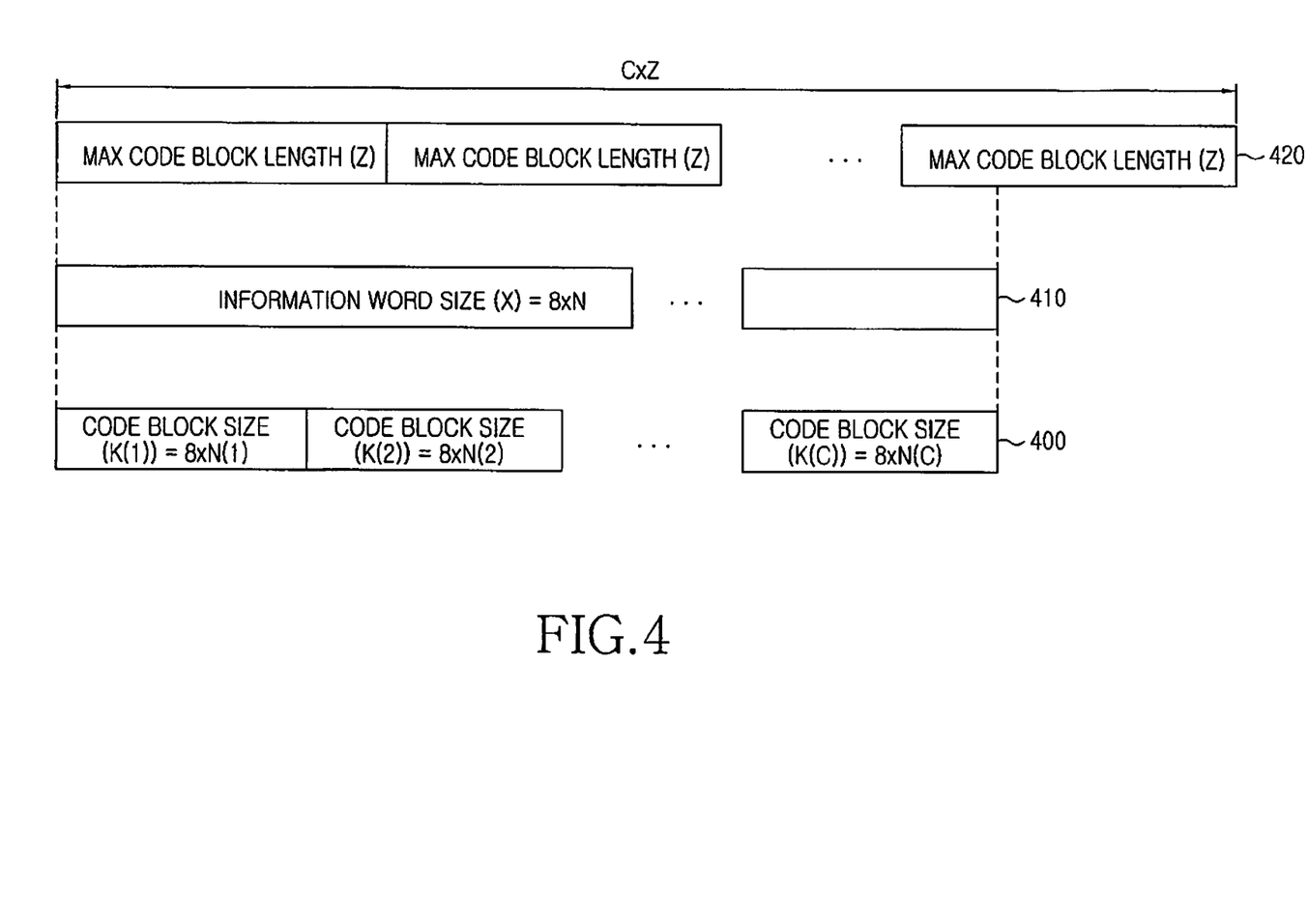
FIG. 4 illustrates code block segmentation according to the present invention.

Referring to FIG. 4, an information word size X 410 is a multiple of eight, and assumed as a scope of $C \cdot Z < x \leq (C+1)Z$. Therefore, in order to prevent a size of each code block from being greater than the maximum code block size Z 420, there is a need for segmentation into a total of C code blocks.

Each code block size 400 of FIG. 4, like the information word size, should be set to satisfy the multiple of eight condition, in order to satisfy the condition of the present invention. That is, a size of each code block can be expressed as K(1), K(2), . . . , K(C), and they can further satisfy the condition of K(1)=K(2)= . . . =K(C).

Examples of the present invention will be made separately for a case where the condition of K(1)=K(2)= . . . =K(C) is additionally satisfied, and another case where the condition is unsatisfied.

The first embodiment provides a description of a process for equalizing lengths of all code blocks. That is, the first embodiment corresponds to the case where K(1)= K(2)= . . . =K(C) in FIG. 4.

In Equation (1), the number C of code blocks is set as C=⌈X/Z⌉.

$$C=\lceil X/Z \rceil \quad (1)$$

In Equation (1), ⌈a⌉ means the minimum integer not less than a.

In Equation (2), a size K of the code block is set as K=8·⌈T/8⌉.

$$K=8\cdot\lceil T/8 \rceil \quad (2)$$

In Equation (2), T=⌈X/C⌉.

In Equation (3), a size Y of filler bits due to the code block generation is defined as Y=C·K−X.

$$Y=C\cdot K-X \quad (3)$$

A description will now be made of an example satisfying Equation (1) through Equation (3). Assuming Z=5120, if a X=13016-bit code is input, the number C of code blocks is C=⌈13016/5120=3⌉ and a length K of each code block is found as follows in Equation (4) according to the first embodiment.

$$K=8\cdot\lceil \lceil 131016/3 \rceil/8 \rceil =8\cdot\lceil 4339/8 \rceil =8\cdot 543=4344 \quad (4)$$

Therefore, each code block is equal in size to 4344, which is a multiple of 8, and the total length Y of generated filler bits is Y=4344*3−13016=16 bits.

Figure 5:
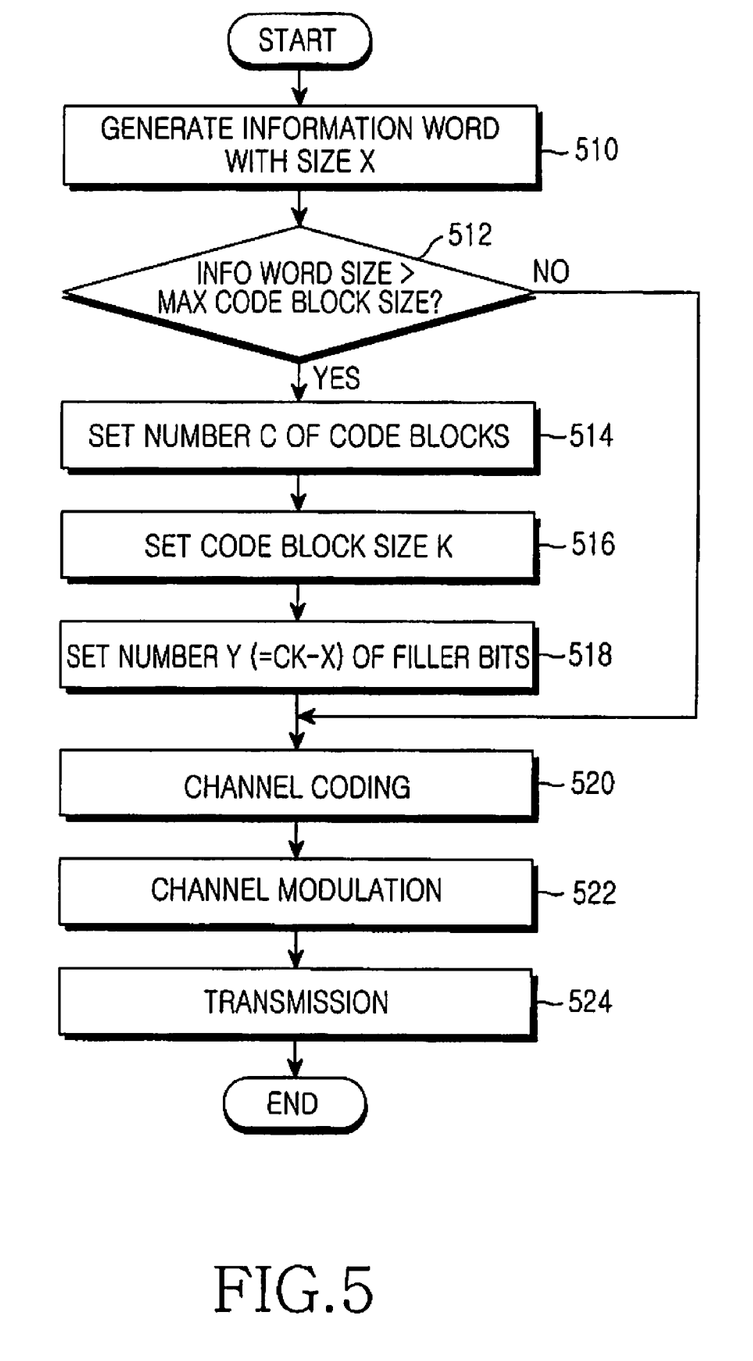
FIG. 5 is a flow chart of a code block segmentation method according to a first embodiment of the present invention.

FIG. 5 illustrates a code block segmentation method according to the first embodiment of the present invention.

Referring to FIG. 5, if an information word with a size X is generated in step 510, a segmentation unit determines in step 512 whether the size X of the information word is greater than the maximum size Z of the code block.

If the size X of the information word is greater than the maximum size Z of the code block, the segmentation unit performs code block segmentation process on the information word in step 514. The code block segmentation process of step 514 is performed using Equation (1). In this way, the number C of code blocks is set.

In step 516, the segmentation unit sets a size K of each code block, and this becomes a specific unit. In step 516, the size K of each code block is determined as Equation (2).

In step 518, the segmentation unit generates Y filler bits using the values C and K as shown in Equation (3). The 'Y filler bits' refer to the bits used for matching each of the code blocks in terms of the number of bits by inserting particular bits. The insertion of the filler bits aims to maintain the same number of bits being input to the channel encoder.

In step 520, the filler bit-inserted code blocks each undergo turbo or convolutional coding, generating a codeword. Thereafter, in step 522, the codeword undergoes channel modulation according to one of the channel modulation schemes of QPSK, 8PSK, 16 QAM, 64QAM, etc, and then transmitted to a receiver in the form of a wireless channel in step 524.

Although the foregoing description has been made with reference to an operation performed in units of eight bits as a unit of the information word, for convenience, the unit of the information word is replaceable with any one of the $8\times 2^n$-bit units as mentioned above. In addition, the foregoing code block segmentation can be applied to other sizes (or units) of the information words.

The second embodiment, unlike the first embodiment, provides a scheme of guaranteeing (allowing) no need for filler bits, or guaranteeing the use of the minimum number of filler bits. The second embodiment provides a scheme of differently setting sizes of code blocks using Equation (5) to Equation (8).

In Equation (5), the number C of code block is set as C=⌈X/Z⌉.

$$C=\lceil X/Z \rceil \quad (5)$$

In Equation (5), ⌈a⌉ means the minimum integer not less than a.

In Equation (6), the minimum size U of the code block is defined as U=8·⌊(X/8)/C⌋.

$$U=8\cdot\lfloor (X/8)/C \rfloor \quad (6)$$

In Equation (7), a size of R=(X−C·U/8 code blocks among the C code blocks is set as U+8.

$$U+8 \quad (7)$$

In Equation (8), a size of C−R code blocks among the C code blocks is set as U.

$$C-R=U \quad (8)$$

A description will now be made of the code block segmentation for the second embodiment where the number of and size of code blocks are determined using Equation (5) through Equation (8). Assuming that Z=5120, if an X=13016-bit code is input, the number C of code block is C=⌈13016/5120⌉=3 according to the second example. That is, unlike the first example, the second example may not need the filler bit. Such examples will be described in more detail below. The minimum size of the code block is U=8·⌊(13016/8)/3⌋=4336, and the number R of code blocks whose size is greater by 1 byte than the minimum size is R=(13016−3·4336)/8=1.

Therefore, according to the second embodiment, a length of one code block is 4336+8=4344, and a length of the remaining 2 code blocks is 4336. Because both of 4344 and 4336 are a multiple of 8, and 4344+2×4336=13016, it can be appreciated that code blocks having the same size as that of the input information word are generated.

In summary, while the first embodiment sets the size of all code blocks to 4344 bits in the same way for the input information word with a code length X=13016, the second embodiment sets the size of 2 code blocks to 4336 bits, and sets a length of one code block to 4344 bits.

According to the present invention, the first embodiment and the second embodiment have a characteristic that a length of each code block is maintained at a multiple of 8. Particularly, the first embodiment advantageously guarantees that all code blocks are completely equal in length, and the second embodiment has an advantage that as many code blocks as possible can be equal in length while there is no filler bit.

Although the foregoing description has been made with reference to an information word configured in the 8-bit unit, an information word configured in the above-stated $8\times 2^n$-bit unit can also be possible by replacing the 8-bit unit with the $8\times 2^n$-bit unit.

Figure 6:
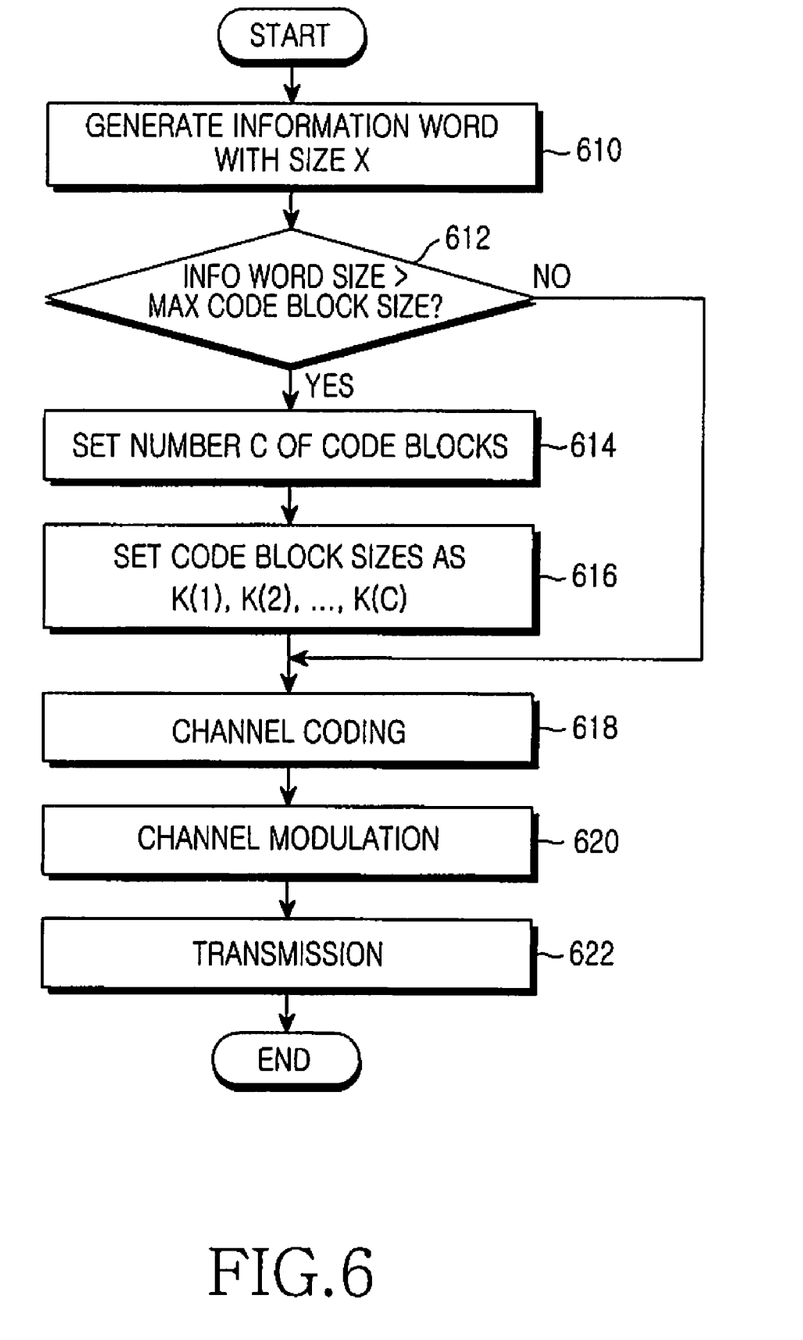
FIG. 6 is a flow chart of a code block segmentation method for setting a code block size to a multiple of a particular number without filler bits according to a second embodiment of the present invention.

FIG. 6 illustrates a code block segmentation method for setting a code block size to a multiple of a particular number without filler bits according to the second embodiment of the present invention.

Referring to FIG. 6, if an information word with a size X is generated in step 610, a segmentation unit determines in step 612 whether the size X of the information word is greater than the maximum size Z of the code block. If the size X of the information word is greater than the maximum size Z of the code block, the segmentation unit performs a code block segmentation process on the information word in step 614. The code block segmentation process step 614 is performed using Equation (5). In this way, the number C of code blocks is set. Thereafter, in step 616, if the size of the generated information word is greater than the maximum size of the code block, the segmentation unit sets the number C of the code blocks to a value grater than 1, and sets a size for each of the code blocks. In this case, the minimum size of the code block is set as Equation (6). The number of code blocks whose size is greater by 1 byte than the code block with the minimum size, among the code blocks, is set as Equation (7), and the number of code blocks with the minimum size is set as Equation (8).

Although the foregoing description has been made with reference to an information word configured in the 8-bit unit, an information word configured in the above-stated $8 \times 2^n$-bit unit can also be possible by replacing the 8-bit unit with the $8 \times 2^n$-bit unit. If the size of the information word is less than or equal to the maximum size of the code block, the information word undergoes a channel coding process without segmentation as it is a single code block. When the segmentation unit sets the size of code blocks with no filler bit as done in the second embodiment, the code blocks can be different from each other in size.

In step 618, the channel encoder performs channel coding separately on each of the code blocks, generating a codeword. Thereafter, in step 620, the codeword undergoes channel modulation according to one of the channel modulation schemes of QPSK, 8PSK, 16 QAM, 64QAM, etc., and then transmitted to a receiver in the form of a wireless channel in step 622.

Therefore, when the second embodiment is applied, an agreement indicating the positions where the large-sized code blocks are located should be previously made between the transmitter and the receiver. That is, it is necessary to allow the transmitter and the receiver to comprehend a size of the corresponding code block without separate control information signaling.

For example, by disposing the large-sized code blocks in the front or back of the information word in a concentrated manner, the transmitter and the receiver can perceive their sizes. That is, the second embodiment provides a method in which after the code block segmentation, the length of the code block configured in the 8-bit unit is maintained.

Figure 7:
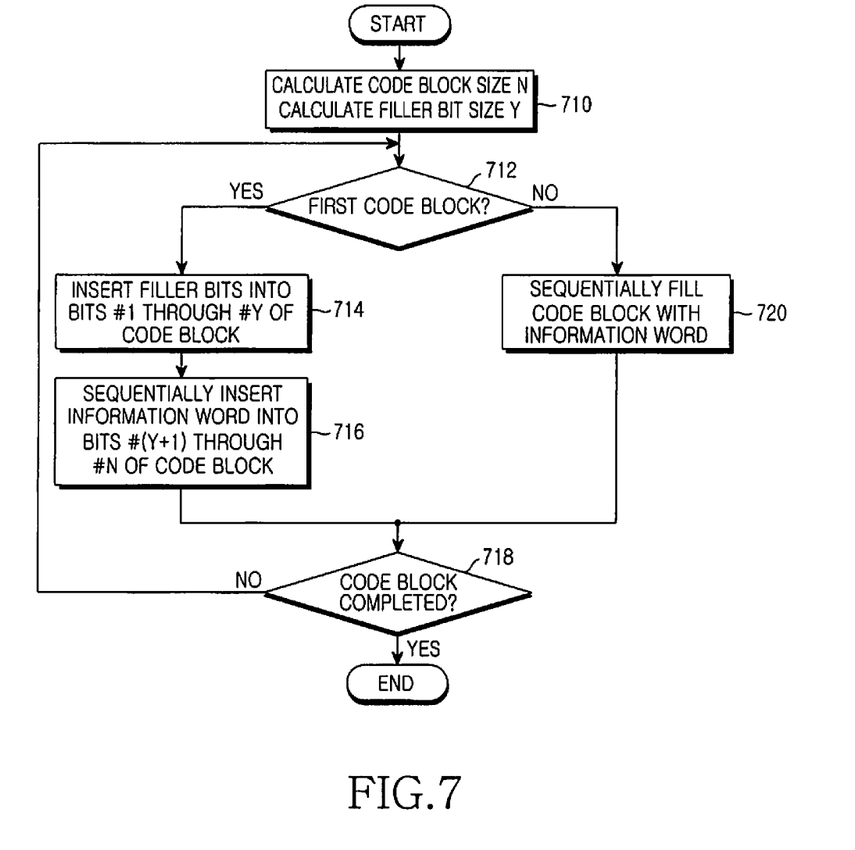
FIG. 7 illustrates a first scheme of inserting filler bits according to the first embodiment of the present invention.

FIG. 7 illustrates a first scheme of inserting filler bits according to the first embodiment of the present invention. That is, shown in FIG. 7 is a signal flow diagram given for the case where filler bits are disposed in the front-most code block among all code blocks according to the first embodiment.

Referring to FIG. 7, in step 710, a segmentation unit calculates a code block size N and a filler bit size Y through steps 510 and 518 of FIG. 5. Thereafter, the segmentation unit determines in step 712 whether the current code block is a first code block. If it is determined that the current code block is a first code block, the segmentation unit proceeds to step 714 where the segmentation unit or a separate filler inserter (not shown) included in the segmentation unit inserts the calculated number Y of filler bits into the first code block. Thereafter, in step 716, the segmentation unit sequentially inserts the information word into bits #(Y+1) through #N of the first code block, generating the first code block.

However, if it is determined in step 712 that the input code block is not the first code block, the segmentation unit proceeds to step 720 where the segmentation unit inserts the sequentially input information words into a code block with the calculated size, generating a plurality of code blocks.

After steps 716 and 720, if multiple code blocks configured in the 8-bit unit, i.e., configured in units of a multiple of eight bits, are generated for the size-X input information word in step 718, the segmentation unit completes the code block segmentation operation, and then transfers each of the generated multiple code blocks to a channel encoder.

As described above, when the input code block is a first code block segmented from one codeword, the segmentation unit fills the bits #1 through #Y of the code block with filler bits, and then sequentially fills the remaining bits of the code block with the information word. The segmentation unit repeats the above operation until all the following code blocks are filled with the codeword.

To determine the positions where the filler bits are inserted, a selected one of the following methods can be used.

Definitions will now be given of the notations used below.

x(j): It indicates a $j^{th}$ bit of a code before a segmentation process (where $1 \leq j \leq X$).

–o(i,j): It indicates a $j^{th}$ bit in an $i^{th}$ code block (where $1 \leq i \leq C$, $1 \leq j \leq K(i)$).

First Filler Insertion Scheme

The following first process provides a technique of inserting filler bits into a first code block according to the first embodiment.

Figure 8:
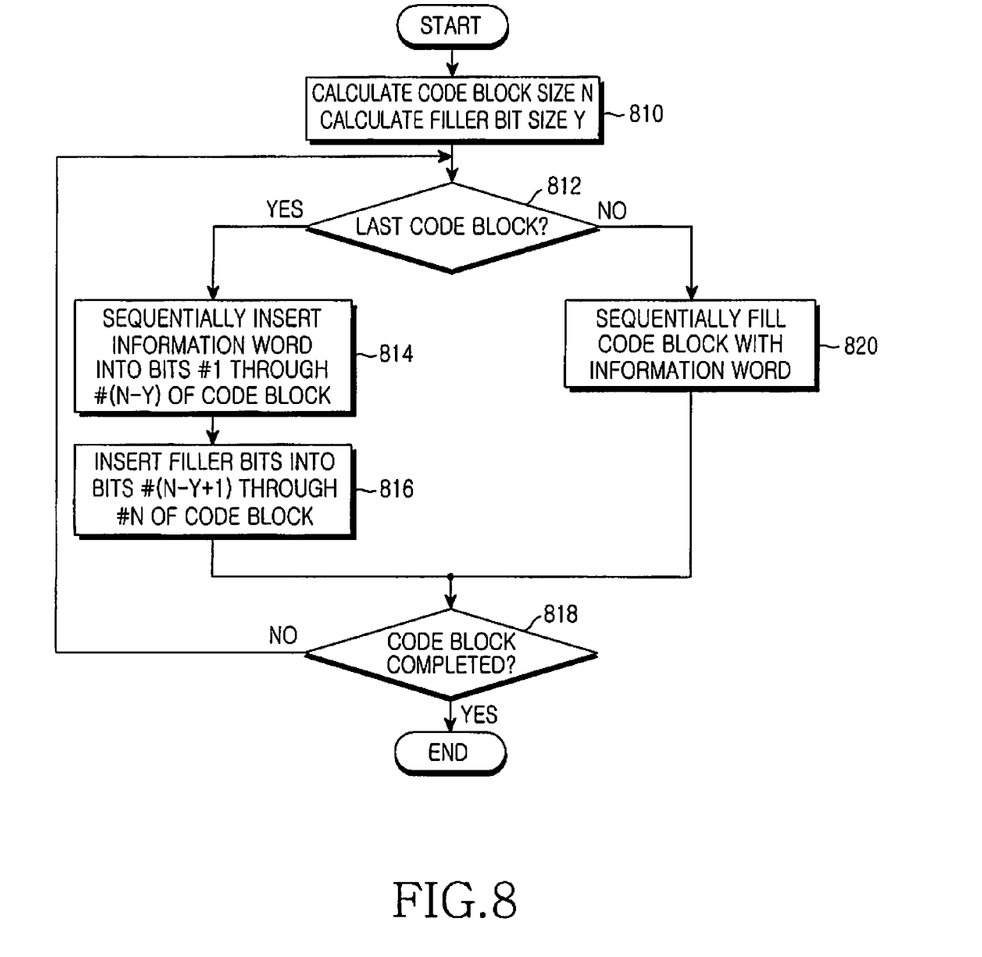
FIG. 8 illustrates a second scheme of inserting filler bits according to the first embodiment of the present invention.

1. for k=1 to Y—Insertion of filler bits
2. o(1,k)=0 (where 0 indicates a filler bit)
3. end for
4. j=0
5. for k=Y+1 to K(1)
6. o(1,k)=x(j)
7. j=j+1
8. end for
9. r=2—Segmentation
10. while r≦C
11. for k=1 to K(i)
12. o(r,k)=x(j)
13. j=j+1
14. end for
15. r=r+1
16. end while FIG. 8 illustrates a second scheme of inserting filler bits according to the first embodiment of the present invention. That is, shown in FIG. 8 is a signal flow diagram given for the case where filler bits are disposed in the backmost code block among all code blocks according to the first embodiment.

Referring to FIG. 8, in step 810, a segmentation unit calculates a code block size N and a filler bit size Y for the size-X information word input through steps 510 to 518 of FIG. 5.

In step 812, the segmentation unit determines whether the current code block is a last code block. If it is determined that the current code block is a last code block, the segmentation unit proceeds to step 814.

In step 814, the segmentation unit or a separate filler inserter (not shown) included in the segmentation unit inserter inserts the sequentially input information word into bits #1 through #(N−Y) of the last code block. Thereafter, in step 816, the segmentation unit inserts filler bits into bits #(N−Y+1) through #N of the last code block. In step 818, if multiple code blocks configured in the 8-bit unit, i.e., configured in units of a multiple of eight bits, are generated for the size-X input information word, the segmentation unit completes the code block segmentation operation, and then transfers each of the generated multiple code blocks to a channel encoder.

However, if it is determined in step 812 that the input code block is not the last code block, the segmentation unit proceeds to step 820 where the segmentation unit inserts the sequentially input information words into a code block with the determined size N, generating code blocks.

As described above, for the calculated code block size N and filler bit size Y, when the current code block is the last code block segmented from one codeword, the segmentation unit sequentially inserts an information word into the bits preceding the last Y bits of the last code block, and then fills the last Y bits with filler bits, thereby completing a code block.

Second Filler Insertion Scheme

The following second process provides a technique of inserting filler bits into the last code block according to the first embodiment.

1. r=1—Segmentation
2. j=0
3. while r≦C
4. for k=1 to K(i)
5. o(r,k)=x(j)
6. j=j+1
7. end for
8. r=r+1
9. end while
10. for k=1 to Y—Insertion of filler bits
11. o(C,K(C)+k)=0 (where 0 indicates a filler bit)

According to the two processes, their associated filler insertion schemes can dispose filler bits into the foremost or backmost parts in the code blocks in a uniformly distributed manner.

According to the present invention, the first embodiment and the second embodiment maintain the length of each code block at a length of the 8-bit unit, guaranteeing that all code blocks are equal in length. Therefore, during channel decoding, the receiver performs channel decoding on the same-length code blocks, thereby improving the system performance.

The foregoing description of the first embodiment and the second embodiment is directed to an example where all filler bits are inserted into one code block. However, when the information bits are distributed over multiple code blocks, the filler bits can be inserted into the code blocks in a uniformly distributed manner. Such a modification would be obvious to those skilled in the art, so a detailed description thereof will be omitted herein for simplicity.

As is apparent from the foregoing description, the present invention, after code block segmentation, configures each code block in units of particular bits, i.e., in units of 8×2" (n=0, 1, 2, 3, . . . ) bits, and performs channel coding thereon, thereby contributing to a minimization in the number of filler bits and a reduction in the system complexity.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for segmenting an information word into code blocks in a mobile communication system, the method comprising:

setting a number C of code blocks to a minimum integer not less than a value obtained by dividing X by Z when a length X of the information word is greater than a maximum length Z of each code block;

determining a minimum integer value T not less than a value obtained by dividing a size of the information word by a number of code blocks when sizes K of all code blocks are determined to be equal, and determining, as K, a maximum value most approaching the value T among values based on which a size of the code block can be set in units of eight bits; and generating a code block by inserting filler bits into a specific code block when a value obtained by multiplying K by C is greater than X.

2. The method of claim 1, wherein the filler bits are inserted into the code blocks in a uniformly distributed manner.

3. The method of claim 2, wherein the filler bits are inserted into a foremost part of each code block.

4. The method of claim 2, wherein the filler bits are inserted into a backmost part of each code block.

5. The method of claim 1, wherein the filler bits are inserted into a foremost part of a first code block.

6. The method of claim 1, wherein the filler bits are inserted after an information word in a last code block.

7. A method for segmenting an information word into code blocks in a mobile communication system, the method comprising:

setting a number C of code blocks to a minimum integer not less than a value obtained by dividing X by Z when a length X of the information word is greater than a maximum length Z of each code block;

setting a minimum size U of each code block so the minimum size U has a size obtained by calculating in units of bits a value having a maximum integer not greater than a value obtained by dividing a value obtained by converting X in units of bytes by C when sizes K of the code blocks are determined to be different from each other;

setting a size of R code blocks among the C code blocks, wherein R corresponds to a value obtained by dividing by eight a difference between X and a product of C and U, and each of the R code blocks has a size greater by one byte than U; and setting remaining code blocks obtained by excluding the R code blocks from the C code blocks so the remaining code blocks have a size of U.

8. A method for channel-encoding and transmitting an information word in a mobile communication system, the method comprising:

a segmentation process of;

setting a number C of code blocks to a minimum integer not less than a value obtained by dividing X by Z when a length X of the information word is greater than a maximum length Z of each code block;

determining a minimum integer value T not less than a value obtained by dividing a size of the information word by a number of code blocks when sizes K of all code blocks are determined to be equal, and determining, as K, a maximum value most approaching the value T among the values based on which a size of the code block can be set in units of eight bits; and generating segmented code blocks by inserting filler bits into a specific code block when a value obtained by multiplying K by C is greater than X;

channel-encoding the segmented code blocks independently; and channel-modulating the channel-encoded code blocks before transmission.

9. The method of claim 8, wherein the filler bits are inserted into the code blocks in a uniformly distributed manner.

10. The method of claim 9, wherein the filler bits are inserted into a foremost part of each code block.

11. The method of claim 9, wherein the filler bits are inserted into a backmost part of each code block.

12. The method of claim 8, wherein the filler bits are inserted into a foremost part of a first code block.

13. The method of claim 8, wherein the filler bits are inserted after an information word in a last code block.

14. A method for channel-encoding and transmitting an information word in a mobile communication system, the method comprising:
   a segmentation process of;
      setting a number C of code blocks to a minimum integer not less than a value obtained by dividing X by Z when a length X of the information word is greater than a maximum length Z of each code block;
      setting a minimum size U of each code block so the minimum size U has a size obtained by calculating in units of bits a value having a maximum integer not greater than a value obtained by dividing a value obtained by converting X in units of bytes by C when sizes K of the code blocks are determined to be different from each other;
      setting a size of R code blocks among the C code blocks, wherein R corresponds to a value obtained by dividing by eight a difference between the X and a product of C and U, and each of the R code blocks has a size greater by one byte than U; and
      setting remaining code blocks obtained by excluding the R code blocks from the C code blocks so the remaining code blocks have a size of U;
   channel-encoding the segmented code blocks independently; and
   channel-modulating the channel-encoded code blocks before transmission.

15. An apparatus for segmenting an information word into code blocks before transmission in a mobile communication system, the apparatus comprising:
   a segmentation unit for;
      setting a number C of code blocks to a minimum integer not less than a value obtained by dividing X by Z when a length X of the information word is greater than a maximum length Z of each code block;
      determining a minimum integer value T not less than a value obtained by dividing a size of the information word by a number of code blocks when sizes K of all code blocks are determined to be equal, and determining, as K, a maximum value most approaching the value T among the values based on which a size of the code block can be set in units of eight bits; and
      generating segmented code blocks by inserting filler bits into a specific code block when a value obtained by multiplying K by C is greater than X;
   a channel encoder for channel-encoding the segmented code blocks independently;
   a channel modulator for channel-modulating the channel-encoded code blocks; and
   a transmitter for converting an output of the channel modulator into a transmission-band signal.

16. The apparatus of claim 15, wherein the segmentation unit inserts the filler bits into the code blocks in a uniformly distributed manner.

17. The apparatus of claim 16, wherein the filler bits are inserted into a foremost part of each code block.

18. The apparatus of claim 16, wherein the filler bits are inserted into a backmost part of each code block.

19. The apparatus of claim 15, wherein the filler bits are inserted into a foremost part of a first code block.

20. The apparatus of claim 15, wherein the filler bits are inserted after an information word in a last code block.

21. An apparatus for segmenting an information word into code blocks before transmission in a mobile communication system, the apparatus comprising:
   a segmentation unit for;
      setting a number C of code blocks to a minimum integer not less than a value obtained by dividing X by Z when a length X of the information word is greater than a maximum length Z of each code block;
      setting a minimum size U of each code block so the minimum size U has a size obtained by calculating in units of bits a value having a maximum integer not greater than a value obtained by dividing a value obtained by converting X in units of bytes by C when sizes K of the code blocks are determined to be different from each other;
      setting a size of R code blocks among the C code blocks, wherein the R corresponds to a value obtained by dividing by eight a difference between X and a product of C and U, and each of the R code blocks has a size greater by one byte than U; and
      setting remaining code blocks obtained by excluding the R code blocks from the C code blocks so the remaining code blocks have a size of U;
   a channel encoder for channel-encoding the segmented code blocks independently;
   a channel modulator for channel-modulating the channel-encoded code blocks; and
   a transmitter for converting an output of the channel modulator into a transmission-band signal.

* * * * *